(12) United States Patent
Suzanne et al.

(10) Patent No.: US 10,938,813 B2
(45) Date of Patent: Mar. 2, 2021

(54) SHARING OF EVENT DATA ACROSS A PLURALITY OF SERVICE PLATFORMS

(71) Applicant: Orange, Paris (FR)

(72) Inventors: Benoit Suzanne, Ville-d'Avray (FR); Jerome Galloyer, L'ile Saint Denis (FR)

(73) Assignee: ORANGE, Paris (FR)

( * ) Notice: Subject to any disclaimer, the term of this patent is extended or adjusted under 35 U.S.C. 154(b) by 339 days.

(21) Appl. No.: 15/739,576

(22) PCT Filed: Jun. 15, 2016

(86) PCT No.: PCT/FR2016/051435
§ 371 (c)(1),
(2) Date: Dec. 22, 2017

(87) PCT Pub. No.: WO2016/207514
PCT Pub. Date: Dec. 29, 2016

(65) Prior Publication Data
US 2018/0316672 A1 Nov. 1, 2018

(30) Foreign Application Priority Data
Jun. 23, 2015 (FR) ...................................... 1555774

(51) Int. Cl.
*G06F 17/00* (2019.01)
*H04L 29/06* (2006.01)
(Continued)

(52) U.S. Cl.
CPC ...... *H04L 63/0884* (2013.01); *H04L 63/0245* (2013.01); *H04L 67/2833* (2013.01);
(Continued)

(58) Field of Classification Search
CPC ............. H04L 63/0884; H04L 67/2838; H04L 67/306; H04L 63/0245; H04L 67/2833;
(Continued)

(56) References Cited

U.S. PATENT DOCUMENTS 9,123,228 B2 * 9/2015 Morehead .............. G08B 29/14
2013/0006400 A1 * 1/2013 Caceres .............. H04L 12/2803
700/90
(Continued)

OTHER PUBLICATIONS

English Translation of the Written Opinion of the International Searching Authority dated Sep. 2, 2016 for corresponding International Application No. PCT/FR2016/051435, filed Jun. 15, 2016.
(Continued)

*Primary Examiner* — Kendall Dolly
*Assistant Examiner* — Kevin Ayala
(74) *Attorney, Agent, or Firm* — David D. Brush; Westman, Champlin & Koehler, P.A.

(57) ABSTRACT

A method for registering a first electronic entity of a user, which is capable of generating event data. The method includes: after a first main service platform dedicated to the first electronic entity receives a first registration request coming from a user terminal and including a user identifier for identifying/authenticating the user by a secondary service platform, the secondary service platform receives a second registration request including the user identifier from the first main service platform. Upon positive identification/authentication of the user by the secondary service platform, the first electronic entity is registered in a database of the secondary service platform, in association with an account of the user. Once the secondary service platform receives event data from the first electronic entity, the event data is made available to the second main service platform.

10 Claims, 3 Drawing Sheets

(51) Int. Cl.
  *H04W 12/00* (2021.01)
  *H04W 12/06* (2021.01)
  *H04L 29/08* (2006.01)
  *H04L 12/24* (2006.01)

(52) U.S. Cl.
  CPC ........ *H04L 67/2838* (2013.01); *H04L 67/306* (2013.01); *H04W 12/06* (2013.01); *H04L 41/022* (2013.01)

(58) Field of Classification Search
  CPC ... H04L 41/022; H04L 67/12; H04L 63/0876; H04W 12/06
  See application file for complete search history.

(56) References Cited

U.S. PATENT DOCUMENTS

| | | | |
|---|---|---|---|
| 2014/0128994 A1* | 5/2014 | Hallman | H04L 12/2809 700/12 |
| 2015/0074554 A1 | 3/2015 | Sasaki et al. | |
| 2016/0071196 A1* | 3/2016 | Joshi | G06Q 30/0269 705/27.1 |
| 2016/0197769 A1* | 7/2016 | Britt | H04L 41/0681 709/223 |
| 2016/0328685 A1* | 11/2016 | Wang | G06Q 40/02 |

OTHER PUBLICATIONS

International Search Report dated Sep. 2, 2016 for corresponding International Application No. PCT/FR2016/051435, filed Jun. 15, 2016.
Written Opinion of the International Searching Authority dated Sep. 2, 2016 for corresponding International Application No. PCT/FR2016/051435, filed Jun. 15, 2016.

* cited by examiner

SHARING OF EVENT DATA ACROSS A PLURALITY OF SERVICE PLATFORMS

CROSS-REFERENCE TO RELATED APPLICATIONS

This Application is a Section 371 National Stage Application of International Application No. PCT/FR2016/051435, filed Jun. 15, 2016, the content of which is incorporated herein by reference in its entirety, and published as WO 2016/207514 on Dec. 29, 2016, not in English.

FIELD OF THE DISCLOSURE

The present invention relates to dataprocessing in a telecommunication network, and more particularly the sharing of data between service platforms.

The invention applies advantageously to the service platforms dedicated to electronic entities of users such as connected objects.

BACKGROUND OF THE DISCLOSURE

A connected object should be understood to be any object capable of implementing given actions and also having a communication interface for sharing information over a network. No restriction is attached to the communication interface considered. Hereinbelow, the example of objects connected to a network by an interface of Wi-Fi type is considered, purely by way of illustration.

No restriction is also attached to the actions implemented by the connected objects: a motion detector detects movements, a temperature sensor measures the temperature of a room in which it is located, a humidity sensor can measure the humidity of the air in a room or the humidity of the earth in a flowerpot, etc. Furthermore, information can be uploaded to a network interface which the connected objects access, then transmitted to a remote or local server, in order for the user to be able to consult that information.

The manufacturers of connected objects generally provide users with a service platform accessible via a network such as the internet. Furthermore, an application dedicated to the service platform can be installed by the user on terminals of smartphone, touch tablet, desktop or laptop computer type, etc.

Thus, when the user acquires a connected weather station, he or she can install on his or her mobile terminal an application from the manufacturer of the weather station to access an online service via a first dedicated service platform (called main service platform hereinbelow). For example, he or she can control the station remotely, consult the latest measurements from the weather station, consult a history of the measurements, receive alerts, set user preferences (alert thresholds for example), etc.

Generally, a user has a plurality of connected objects, fulfilling distinct and sometimes complementary functionalities.

For example, in addition to the weather station, the user may have a connected humidity sensor, placed in the earth of a flowerpot, marketed by another manufacturer and uploading humidity measurements to a second service platform, distinct from the first service platform.

Other connected objects may upload data to service platforms respectively dedicated to their manufacturers. These data are hereinafter called "event data" and cover, at the same time, one-off measurements performed by a connected object (detection of an opening of a door, one-off temperature measurement), statistics generated on the basis of one-off or continuous measurements, or even alerts indicating that a measured quantity exceeds (or passes below) a certain threshold.

To consult the data of one of his or her objects, the user must thus launch a dedicated application (or access the dedicated service platform by another means). To this end, he or she may need to be authenticated to access the data uploaded by the connected object.

The consultation of the data uploaded by several objects from different manufacturers therefore requires several successive authentications, with potentially distinct identifiers and passwords.

Furthermore, it would be desirable to be able to group together the data from objects from different manufacturers within a single interface accessible by the user, on the one hand to simplify the access to all of the data, and on the other hand because some data may be interlinked, this link being able to be used. For example, from the humidity information from the humidity sensor, and from the weather station data, it is possible to predict the trend of the humidity over the next few days, which is relevant information for the user.

There is thus a need to simplify the identification/authentication of the user of connected objects with a service platform while allowing the sharing of data from connected objects from different manufacturers.

SUMMARY

The present invention improves this situation.

To this end, it proposes a method for registering a first electronic entity of a user, the first electronic entity being able to generate event data, the method comprising:
 following the reception of a first request for registration by a first main service platform dedicated to the first electronic entity, said first registration request being from a user terminal and including a user identifier intended for the identification/authentication of the user by a secondary service platform, reception by the secondary service platform from the first main service platform of a second registration request, the second request including the user identifier;
 upon positive identification/authentication of the user by the secondary service platform, registration of the first electronic entity in a database of the secondary service platform, in association with an account of the user, at least one second electronic entity dedicated to a second main service platform having been registered previously in association with the account of the user;
 upon reception by the secondary service platform of event data from the first electronic entity, provide said event data to the second main service platform.

Thus, not only is the registration of electronic entities from different manufacturers (associated with different main service platforms) simplified by the use of a single user identifier, but the present invention further allows the sharing of event data from these different electronic entities.

According to an embodiment of the invention, the provision of the event data can comprise the transmission of said event data to the second main service platform.

The second main service platform (and the other main service platforms if there are any) are thus informed in real time of the new event data published. These event data can then be used by the second main service platform, to enrich the event data of electronic entities that it manages for example (the event data of the second electronic entity).

According to one embodiment of the invention, in which the provision of the event data (upon registration and acceptance of the user) comprises the sending to the second main service platform of a notification indicating that new event data from the user are accessible on the secondary service platform.

Thus, the consultation of the event data can be deferred, which avoids pointless transmissions in the case where the second main service platform does not need to consult the event data.

In one embodiment of the invention, the method further comprises the following step:
- upon reception of the second registration request, the secondary service platform requests the definition of at least one confidentiality rule to be associated with the first electronic entity, the confidentiality rule being registered in association with the first electronic entity in the secondary service platform;
- upon reception of the event data from the first electronic entity, filtering by the secondary service platform of the event data on the basis of the confidentiality rules associated with the first electronic entity, and provision of the filtered event data to the second main service platform.

Thus, the sharing of the data can be delimited by confidentiality rules. These rules can be defined by the user or by the first main service platform.

According to one embodiment of the invention, upon reception by the secondary service platform of event data from the second electronic entity, the method can further comprise the provision of the event data to the first main service platform.

Thus, the sharing of the data is applied to all the main service platforms that want to collaborate with the secondary service platform. The event data from different electronic entities therefore allow a mutual enrichment of all of the main service platforms.

In addition, the method can further comprise the following steps:
- upon reception of the second registration request, the secondary service platform requests the definition of a first filtering rule to be associated with the first electronic entity, the first filtering rule being registered in association with the first electronic entity in the secondary service platform; and
- upon reception of the event data from the second electronic entity, filtering by the secondary service platform of the event data on the basis of the first filtering rule associated with the first electronic entity, and provision of the filtered event data to the first main service platform.

Thus, this embodiment makes it possible to limit the transmissions in the telecommunication network by avoiding provisions of event data that are not wanted by the main service platforms.

According to one embodiment, the second electronic entity can be registered in the main service platform in association with at least one second filtering rule for filtering the data to be transmitted to the second main service platform, and the event data from the first electronic entity can be filtered on the basis of the second filtering rule before being provided to the second main service platform.

This embodiment also makes it possible to limit the transmissions in the telecommunication network.

In one embodiment of the invention, the secondary service platform can store user information in association with the account of the user and, upon positive identification/authentication of the user by the secondary service platform, the secondary service platform can transmit the user information to the first main service platform.

Thus, the first main service platform has information allowing the creation of a user account, transparently for the user who does not have to input any information.

A second aspect of the invention relates to a computer program product comprising instructions for implementing the method according to the first aspect of the invention, when this program is run by a processor.

A third aspect of the invention relates to a secondary service platform for registering a first electronic entity of a user, comprising:
- a reception interface for receiving, following the reception of a first request for registration by a first main service platform dedicated to the first electronic entity, the first registration request being from a user terminal and including a user identifier intended for the identification/authentication of the user by the secondary service platform, a second registration request from the first service platform, the second request including the user identifier;
- a processor configured to, upon positive identification/authentication of the user by the secondary service platform, register the first electronic entity in a database of the secondary service platform, in association with an account of the user, at least one second electronic entity dedicated to a second main service platform having been registered previously in association with the account of the user.

The reception interface is also capable of receiving event data from the first electronic entity and the processor is capable of providing the event data to the second main service platform.

A fourth aspect of the invention relates to a system comprising a secondary service platform according to the third aspect of the invention, a first main service platform and a second main service platform.

BRIEF DESCRIPTION OF THE DRAWINGS

Other features and advantages of the invention will become apparent on studying the following detailed description, and the attached drawings in which.

DETAILED DESCRIPTION OF ILLUSTRATIVE EMBODIMENTS

Figure 1:
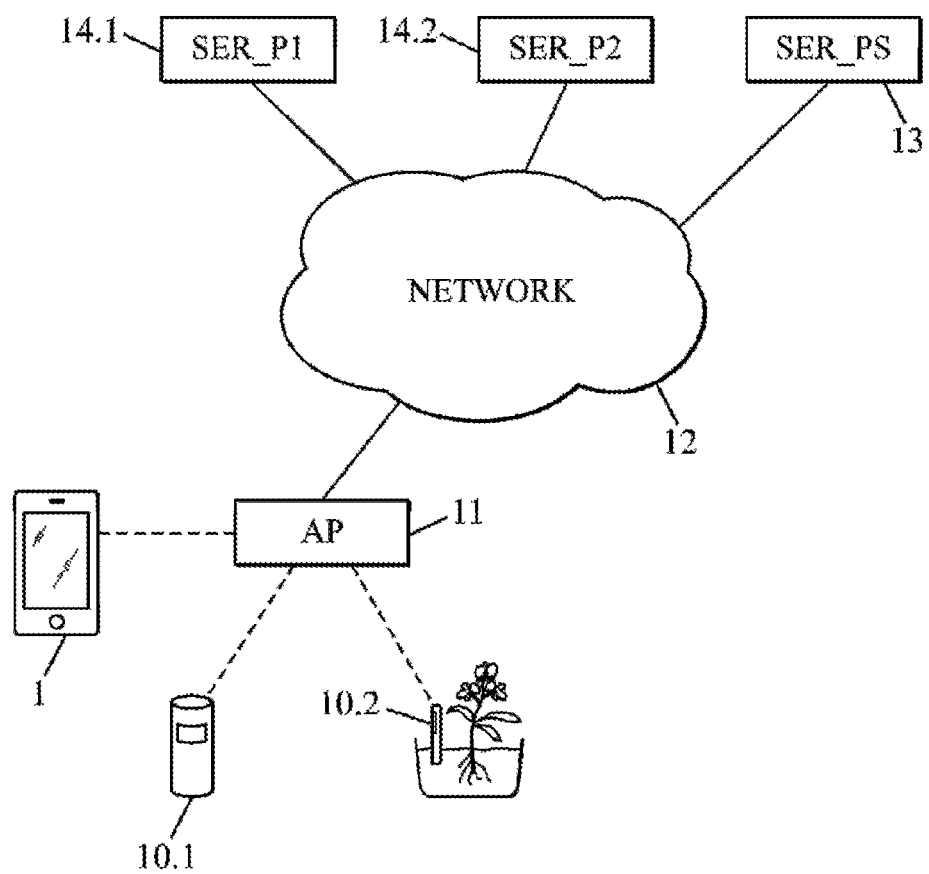
FIG. 1 illustrates a system according to an embodiment of the invention.

FIG. 1 illustrates a system according to an embodiment of the invention.

The system comprises a terminal 1 of the user, a first electronic entity 10.1 and a second electronic entity 10.2, all three of which can access a network 12, such as the Internet network, via an access point 11. Although the access via a single access point 12 has been represented with reference to FIG. 1, several separate access points can be provided. For example, according to a variant, the mobile terminal can access the network 12 via a base station of a mobile network while the electronic entities access the network 12 via a Wi-Fi terminal.

The terminal 1 covers any electronic device by which a user can access the access point 11, via a wired link (Ethernet for example) or wirelessly (Wi-Fi for example) and optionally having a user interface. To this end, the mobile terminal 1 can encompass a portable telephone (a smartphone for example), a touch tablet, a laptop or desktop computer, etc., and access the network 12 directly or indirectly.

Hereinbelow, the first electronic entity 10.1 is considered to be a weather station connected to the user of the terminal 1. The first electronic entity can thus acquire temperature and/or relative humidity measurements or detect crossings of thresholds that are predefined or can be set by the user. Thus, the first electronic entity 10.1 can more generally obtain event data, these event data being able to be uploaded via the access point 11 and the network 12 to a first main service platform 14.1. The first main service platform 14.1 can belong to a manufacturer of connected objects, of which the first electronic entity 10.1 forms part. The first main service platform 14.1 can also, as is well known, be accessible via a first dedicated application installed on the terminal 1 of the user. Via this first dedicated application, the user can access all of his or her connected objects which are managed by the manufacturer of the first electronic entity 10.1.

The second electronic entity 10.2 can be a humidity sensor intended to be placed in a flowerpot of the user. Thus, humidity measurements or alerts (or any other event datum) can be uploaded to a second main service platform 14.2 via the access point 11 and the network 12. The second main service platform 14.2 can belong to a manufacturer of connected objects, of which the second electronic entity 10.2 forms part. The second main service platform 14.2 can also, as is well known, be accessible via a second dedicated application installed on the terminal 1 of the user. Via this second dedicated application, the user can access all of his or her connected objects which are managed by the manufacturer of the first electronic entity 10.1.

Thus, a main service platform should be understood to be any service platform dedicated to only a subgroup of electronic entities, typically electronic entities originating from the same manufacturer.

The user can therefore, conventionally, access the event data uploaded respectively by the first and second electronic entities via distinct applications installed on the terminal 1. For that, the electronic entities are generally registered previously by the user with their respective service platforms.

To this end, during initial steps, the user can install the first dedicated application on his or her terminal 1 in order to access the first service platform 14.1 in order to register the first electronic entity 14.1. The same applies when initializing the second electronic entity 14.2. As detailed hereinbelow, the steps of registration of the electronic entities are simplified and allow the sharing of data between electronic entities from different manufacturers.

To this end, the system illustrated in FIG. 1 further comprises a secondary service platform 13, accessible via the network 12 and whose functionalities are described hereinbelow.

Figure 2:
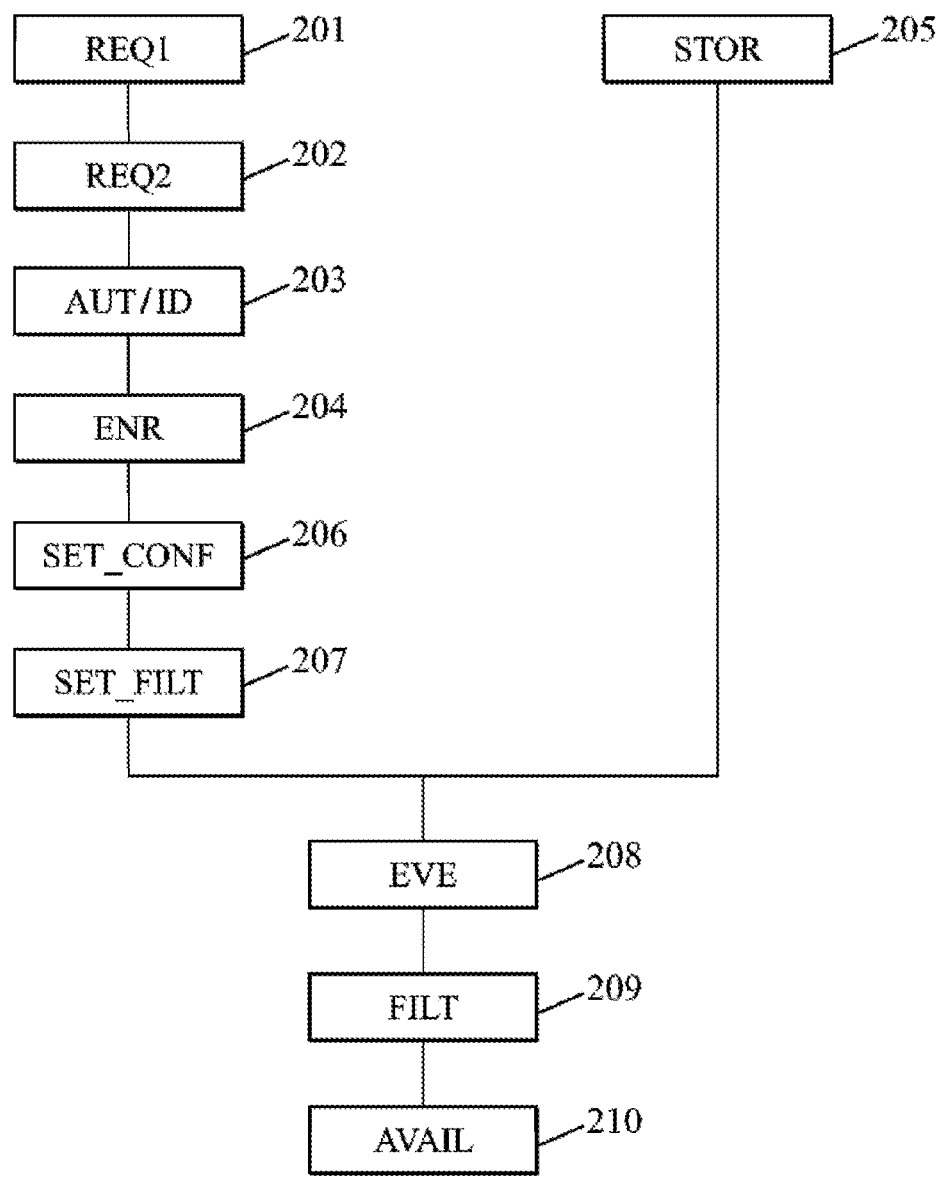
FIG. 2 is a diagram illustrating the steps of a method according to an embodiment of the invention.

FIG. 2 is a diagram illustrating the steps of a method according to an embodiment of the invention.

In a step 201, the first main service platform 14.1 receives a first registration request with a view to registering the first electronic entity 10.1 from the terminal 1. For example, the user has just acquired the first electronic entity 10.1, has installed an application allowing access to the first main service platform 14.1 (or as a variant accesses the first main service platform 14.1 via a web page) and accesses a section allowing the registration of electronic entities from the manufacturer managing the first main service platform 14.1.

According to the invention, the first main service platform 14.1 may prompt the user to proceed with registering the first electronic entity 10.1 via the secondary service platform 13. To this end, a pop-up window may be displayed on the page, prompting the user to enter a user identifier allowing his or her identification/authentication by the secondary service platform 13. For example, the secondary service platform may be a social network platform on which the user already has an account and an associated user identifier. As a variant, the secondary service platform 13 may be a service platform of a telephone operator with which a user can be identified by a telephone number or any other user identifier.

The first registration request thus includes a user identifier intended for the user to be identified/authenticated by the secondary service platform 13.

Upon reception of the first registration request, the first main service platform 14.1 transmits, in a step 202, a second registration request to the secondary service platform 13, the second registration request including the user identifier contained in the first registration request.

In a step 203, the secondary service platform 13 identifies/authenticates the user by means of the user identifier contained in the second registration request. When the user identifier is an identifier of login type, and in the context of an authentication, the secondary service platform 13 may also ask the user for a password. To this end, a window including a field for inserting a password may be displayed on the terminal 1.

Upon positive identification/authentication of the user in the step 203, the secondary service platform proceeds, in the step 204, with the registration of the first electronic entity 10.1 in an internal database, in association with an account of the user (social network account when the secondary service platform 13 is a social network platform, client account when the secondary service platform 13 is a platform of a telephone operator, or OTT (over the top)).

In the context of the invention, the second electronic entity 10.2 has been the subject of a previous registration by the secondary service platform 13 in a step 205. To this end, steps corresponding to the steps 201 to 204 may have been implemented by the second main service platform 14.2 and the secondary service platform 13.

According to an additional embodiment of the invention, the secondary service platform 13 may request the definition, following the step 202, of at least one confidentiality rule to be associated with the first electronic entity 10.1.

To this end, a window can be displayed on the terminal 1 in order for the user to select a rule (by checking one or more boxes) out of a set of rules offered. As a variant, the confidentiality rule can be defined by the first main service platform 14.1, in a way that is transparent for the user.

A confidentiality rule is the term used to describe any rule restricting the sharing of the event data from the first electronic entity 10.1. For example, a choice can be made as to which main service platforms other than the first main service platform 14.1 are authorized to receive the event data from the first electronic entity 10.1. Obviously, the confidentiality rule can be that no restriction is attached to the sharing of the event data from the first electronic entity 10.1.

The confidentiality rule thus defined is then registered in a step 206 in association with the first electronic entity 10.1 in the secondary service platform 13.

The application of such confidentiality rules will be described hereinbelow.

Furthermore, alternatively or in addition, the secondary service platform 13 can request the definition, following the step 202, of at least one filtering rule to be associated with the first electronic entity. The expression "filtering rule" covers any rule restricting or designating the event data from electronic entities other than the first electronic entity 10.1 which are provided to the first service platform 14.1. Through the definition of filtering rules, the first service platform 14.1 can thus indicate the event data that it wants to receive and/or the event data that it does not want to receive. For example, in the example where the first electronic entity 10.1 is a weather station, the event data from a connected coffee machine are of no great interest to the first main service platform 14.1. The user or the main service platform 14.1 can thus choose to not receive such event data, by the definition of a filtering rule. As a variant, the filtering rule may consist in choosing the frequency at which event data are provided to the first main service platform 14.1.

The filtering rule thus defined is then registered in a step 207 in association with the first electronic entity 10.1 in the secondary service platform 13.

As described above, the confidentiality rules and the filtering rules can be defined as soon as the first electronic entity 10.1 is registered. Furthermore, the invention provides for such rules to be able to be reconfigured in subsequent steps. For example, the user can subsequently be identified/authenticated by the secondary service platform in order to modify or delete the existing rules or in order to create new rules.

In parallel, the user can also have defined, in the step 205, confidentiality rules and filtering rules to be associated with the second electronic entity.

Following the registration of at least two electronic entities in the secondary service platform 13, these two electronic entities having distinct main service platforms, the method according to the invention allows the sharing of the event data from these electronic entities.

To this end, event data can be uploaded by the first electronic entity in a step 208. For example, the event data can indicate the forecasting of the crossing of a temperature threshold over a given period. The event data are transmitted by the first main service platform 14.1 to the secondary service platform 13.

In an optional step 209, the event data received by the secondary service platform 13 are filtered by the confidentiality rules associated with the first electronic entity having uploaded the data and by the filtering rules associated with the other electronic entities (the second electronic entity 10.2) in the database of the second main service platform 14.2. For example, the event data are not provided to the second main service platform 14.2 if the second electronic entity 10.2 is associated with a filtering rule consisting in not receiving weather data.

The event data from the first electronic entity 10.1, and possibly filtered, are then provided to the service platforms other than the first service platform 10.1. Thus, if no filtering or confidentiality rule prevents such provision, the event data from the first electronic entity (weather data) are provided to the second main service platform 14.2 in a step 210 (and to any other main service platform if there are any and if the confidentiality and filtering rules permit it).

The expression "provision" can cover the transmission of the event data to the second main service platform 14.2, or even the sending to the second main service platform 14.2 of a notification indicating that new event data from the user are accessible on the secondary service platform 13. In this case, the second main service platform 14.2 can access the account of the user in order to recover all of the event data (subject to the filtering and confidentiality rules) associated with electronic entities of other main service platforms.

Thus, the present invention advantageously makes it possible to simplify the registrations of electronic entities of the user, regardless of the associated main service platform, by means of a single identifier, while allowing the sharing of the event data. The confidentiality can also be ensured by the definition of rules.

Symmetrically, the event data uploaded to the secondary service platform 13 can originate from the second electronic entity 10.2. In this case, they can be filtered by confidentiality rules associated with the second electronic entity 10.2 and by filtering rules possibly associated with the first electronic entity 10.1 before being provided to the first electronic entity 10.1.

Furthermore, as detailed hereinabove, the secondary service platform 13 can be a social network platform or a telephone operator platform, on which the user has a user account. Such a user account can be associated with user information, such as the address, the name, the telephone number, the mail address, a pseudonym of the user. Thus, following the registration of the first electronic entity 10.1 in the step 204, the secondary service platform 13 can transmit user information to the first main service platform 14.1. These data can be used by the first main service platform 14.1 in order to create a user account in a database local to the first main service platform 14.1. Before communicating these user data, the user can define the data that they want the secondary service platform 13 to communicate to the first main service platform 14.1.

Figure 3:
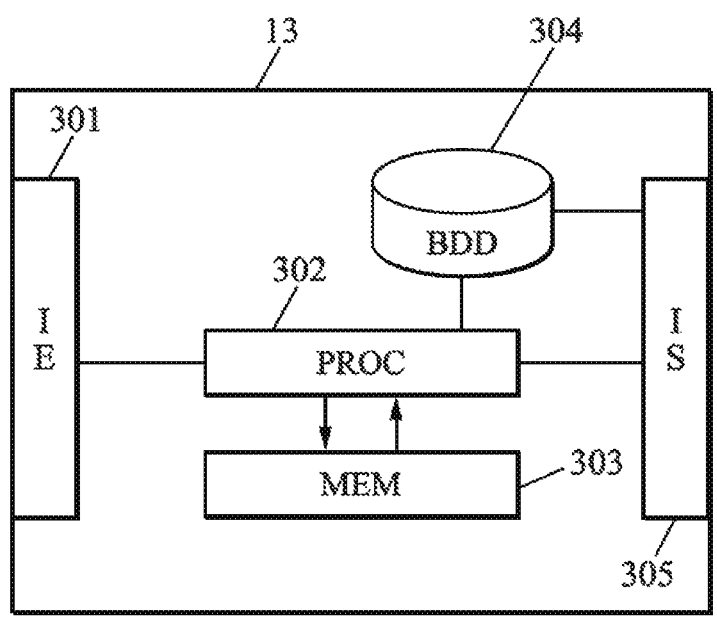
FIG. 3 represents a secondary service platform according to an embodiment of the invention.

FIG. 3 represents a secondary service platform 13 according to an embodiment of the invention.

The secondary service platform 13 comprises a random access memory 303 and a processor 302 for storing instructions allowing the implementation of steps of the steps 202 to 210 of the method described hereinabove. The secondary service platform 13 also comprises a database 304 for storing data intended to be retained after the application of the method, in particular the user account data, comprising the different electronic entities, possibly in association with filtering rules and/or confidentiality rules. The data of a user account can also include user information (address, name, first name, date of birth, etc.), notably when the secondary service platform 13 is a social network platform or a telephone operator platform. The event data can also be stored in the database 304. The secondary service platform 13 also comprises an input interface 301 intended to receive the event data, the definitions of confidentiality and filtering rules, the requests for registration of the entities, and an output interface 305 intended to provide the event data to the main service platforms and optionally intended to transmit user information to the main service platforms.

The present invention is not limited to the embodiments described hereinabove by way of examples; it extends to other variants.

In addition, the examples given involve two connected entities and two main service platforms. Such an architecture is given purely by way of illustration and should not restrict the invention to just this single example.

Although the present disclosure has been described with reference to one or more examples, workers skilled in the art will recognize that changes may be made in form and detail without departing from the scope of the disclosure and/or the appended claims.

The invention claimed is:

1. A method for registering a first electronic entity of a user, the first electronic entity being able to generate event data, the method comprising:
   following reception of a first request for registration of said first electronic entity by a first main service platform dedicated to the first electronic entity, said first registration request being from a user terminal and including a user identifier intended for the identification/authentication of the user by a secondary service platform, reception by the secondary service platform from the first main service platform of a second request for registration of said first electronic entity, the second request including the user identifier;
   upon positive identification/authentication of the user by the secondary service platform, registration of the first electronic entity in a database of the secondary service platform, in association with an account of the user, at least one second electronic entity dedicated to a second main service platform having been registered previously in association with the account of the user;
   upon reception of the second registration request, the secondary service platform requests definition of at least one confidentiality rule to be associated with the first electronic entity, the confidentiality rule being registered in association with the first electronic entity in the secondary service platform and restricting sharing of the event data from the first electronic entity; and
   on reception of the event data from the first electronic entity, filtering by the secondary service platform said event data on the basis of the at least one confidentiality rule associated with the first electronic entity, and providing the filtered event data to the second main service platform.

2. The method as claimed in claim 1, in which providing the event data comprises transmission of said event data to the second main service platform.

3. The method as claimed in claim 1, in which providing the event data comprises sending to the second main service platform a notification indicating that new event data from the user are accessible on the secondary service platform.

4. The method as claimed in claim 1, in which, upon reception by the secondary service platform of event data from the second electronic entity, the method further comprises providing said event data to the first main service platform.

5. The method as claimed in claim 4, in which the method further comprises:
   upon reception of the second registration request, the secondary service platform requests definition of a first filtering rule to be associated with the first electronic entity, the first filtering rule being registered in association with the first electronic entity in the secondary service platform; and
   upon reception of the event data from the second electronic entity, filtering by the secondary service platform said event data on the basis of the first filtering rule associated with the first electronic entity, and providing the filtered event data to the first main service platform.

6. The method as claimed in claim 1, in which the second electronic entity is registered in the secondary service platform in association with at least one second filtering rule for filtering the data to be transmitted to the second main service platform, and in which the event data from the first electronic entity are filtered on the basis of the second filtering rule before being provided to the second main service platform.

7. The method as claimed in claim 1, in which the secondary service platform stores user information in association with the account of the user and in which, upon positive identification/authentication of the user by the secondary service platform, the secondary service platform transmits the user information to the first main service platform.

8. A non-transitory computer-readable medium comprising instructions stored thereon for implementing a method for registering a first electronic entity of a user, when the instructions are run by a processor of a secondary service platform, the first electronic entity being able to generate event data, the method comprising:
   following reception of a first request for registration of said first electronic entity by a first main service platform dedicated to the first electronic entity, said first registration request being from a user terminal and including a user identifier intended for the identification/authentication of the user by the secondary service platform, reception by the secondary service platform from the first main service platform of a second request for registration of said first electronic entity, the second request including the user identifier;
   upon positive identification/authentication of the user by the secondary service platform, registration of the first electronic entity in a database of the secondary service platform, in association with an account of the user, at least one second electronic entity dedicated to a second main service platform having been registered previously in association with the account of the user;
   upon reception of the second registration request, the secondary service platform requesting definition of at least one confidentiality rule to be associated with the first electronic entity, the confidentiality rule being registered in association with the first electronic entity in the secondary service platform and restricting sharing of the event data from the first electronic entity; and
   on reception of the event data from the first electronic entity, filtering by the secondary service platform said event data on the basis of the at least one confidentiality rule associated with the first electronic entity, and providing the filtered event data to the second main service platform.

9. A system comprising:
   a secondary service platform comprising a hardware processor for registering a first electronic entity of a user, comprising:
      a reception interface configured to receive, following reception of a first request for registration by a first main service platform dedicated to the first electronic entity, said first registration request being from a user terminal and including a user identifier intended for the identification/authentication of the user by the secondary service platform, a second registration request from the first service platform, the second request including the user identifier; and
      a processor configured to, upon positive identification/authentication of the user by the secondary service platform, register the first electronic entity in a database of the secondary service platform, in association with an account of the user, at least one second electronic entity dedicated to a second main service platform having been registered previously in association with the account of the user;
      in which the reception interface is also configured to receive event data from the first electronic entity;

and wherein the processor is further configured to:
upon reception of the second registration request, request definition of at least one confidentiality rule to be associated with the first electronic entity, the confidentiality rule being registered in association with the first electronic entity in the secondary service platform and restricting sharing of the event data from the first electronic entity; and on reception of the event data from the first electronic entity, filter by the secondary service platform said event data on the basis of the at least one confidentiality rule associated with the first electronic entity, and providing the filtered event data to the second main service platform.

10. The system of claim 9, further comprising the first main service platform and the second main service platform.

* * * * *